C. W. CROGAN.
TAPE MEASURE.
APPLICATION FILED FEB. 6, 1915.
1,216,418.
Patented Feb. 20, 1917.
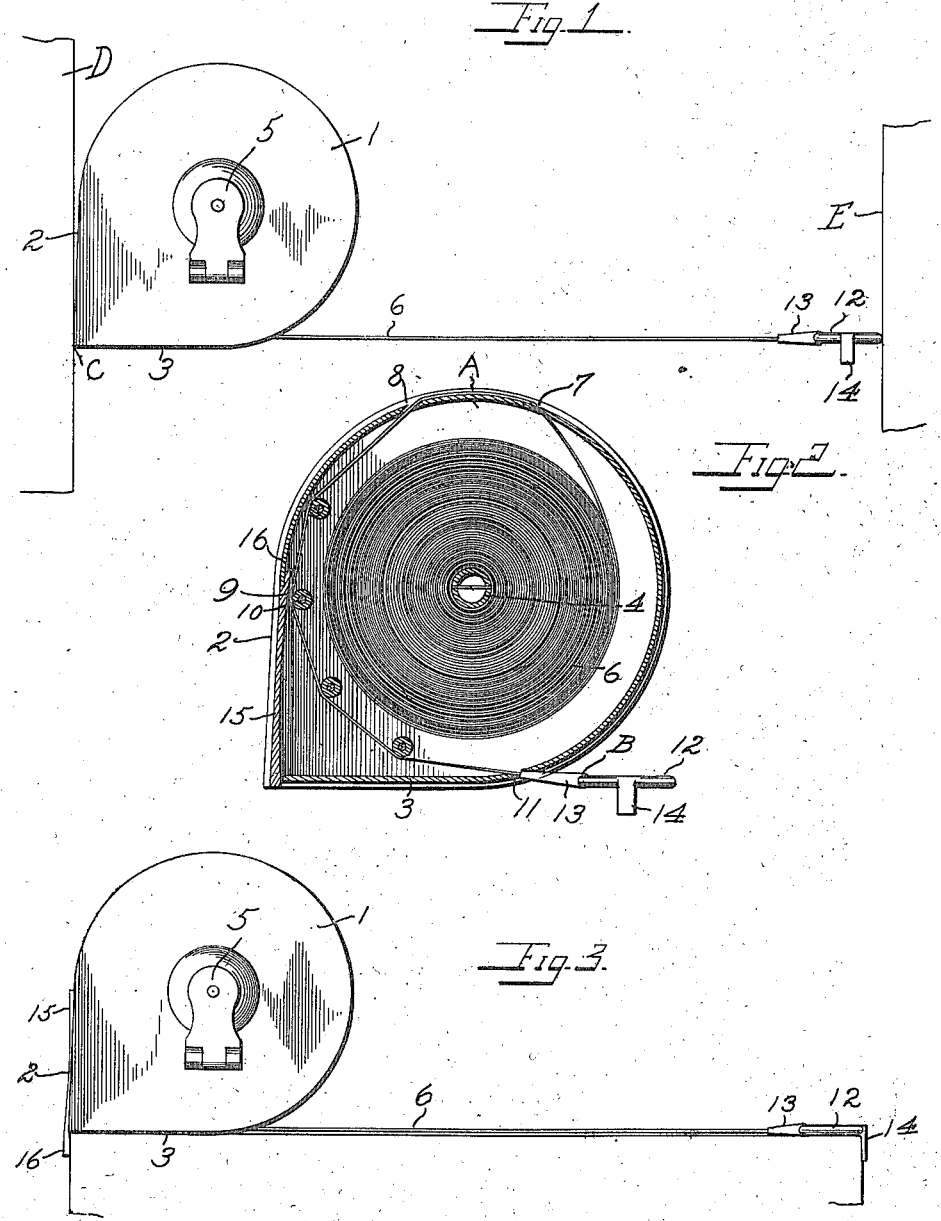

UNITED STATES PATENT OFFICE.

CHARLES W. CROGAN, OF BANGOR, MAINE.

TAPE-MEASURE.

1,216,418. Specification of Letters Patent. Patented Feb. 20, 1917.

Application filed February 6, 1915. Serial No. 6,565.

*To all whom it may concern:*

Be it known that I, CHARLES W. CROGAN, a citizen of the United States, residing at Bangor, in the county of Penobscot and State of Maine, have invented certain new and useful Improvements in Tape-Measures, of which the following is a specification.

This invention relates to improvements in measuring instruments and more specifically to tape measures.

The object of my invention is to provide an improved form of tape measure that will enable the correct measurement of irregular objects to be ascertained.

A further object of my invention is to provide a tape measure, wherein the correct measurement of an object, or the distance between two objects, is indicated on the upper edge of the casing containing the tape. This eliminates the inaccuracy of measurement which invariably results when the finger or thumb is used as an indicator.

A still further object of my invention is to provide a tape measure casing equipped with an attachment adapted to engage the edge of a piece of timber; also a ring, having a depending lug formed thereon, is secured to the free end of the tape, adapted to engage the opposite end of the timber. By this means one man can do the work ordinarily requiring the services of two men, and at the same time securing a more accurate measurement.

Other objects of this invention not at this time more particularly enumerated, will be clearly understood from the detailed description and drawings forming a part of this specification.

Furthermore, this invention consists in the novel arrangement and combination of parts more particularly described in the following specification and embodied in the claims appended hereunto and forming a part of this application.

Referring now to the drawings, which are merely illustrative of my invention,

Figure 1 is a side elevation of my invention illustrating the manner in which the correct distance between two objects is measured.

Fig. 2 is a vertical sectional view of my improved form of tape measure.

Fig. 3 is a side elevation of my invention illustrating the manner in which a piece of timber is measured.

Referring further to the drawings, wherein similar reference characters designate similar parts throughout the respective views, 1 designates a casing turbinate shaped in side elevation, which said casing, when held in operative position, has a vertical edge 2 and a horizontal edge 3. The conventional type of tape spindle 4 is mounted transversely through the center of said casing, said spindle being provided with a handle 5 and having a tape 6 wound thereon.

Slots 7 and 8 are formed transversely through the edge of said casing in spaced apart relation and at points upon the uppermost portion thereof with respect to the operative position of said casing. A similar slot 11 is formed through said casing at a point opposite said slots 7 and 8.

A plurality of guide rollers 9 are rotatably mounted upon pins 10 having their bearings in the side walls of said casing, near the edge thereof, and spaced apart within the casing between the slots 8 and 11.

The tape 6, wound upon the spindle 4, is adapted to pass out of the casing through the slot 7, back into the casing through the slot 8, thence over the guide rollers and between them and the inner edge of the casing, and passing out of the casing through the slot 11. A bonding member 13 is secured to the free end of the tape and a ring 12 is slidably mounted thereon. A lug 14 is formed upon said ring in such manner that the inner face of said lug will be even with the outer edge of said ring.

The vertical edge 2 of the casing is cut away though closable by means of a slide cover 15, provided with side tongues to fit into grooves formed in the side walls of said casing along said cut away portion. Said slide is formed with a tongue extension 16 upon one end thereof which fits beneath the interior face of the edge of the casing. The tongue extension 16 is so arranged that when the slide is pushed into its seat in reversed position, said tongue will extend beyond the horizontal face 3 and the inner face of said tongue will become the measuring point.

An indicator line is drawn transversely across the edge of the casing at A intermediate the slots 7 and 8.

When the tape is fully wound upon the spindle, that portion thereof which registers at the indicator A will be zero, there being no graduations on the end of the tape from A to B. The lower extremity C of the outer face of the vertical edge 2 of the casing is the normal measuring point, so that when that portion of the casing is placed against one of two separated objects D, and the outer edge of the ring 12 is placed against the other object E, as shown in Fig. 1, the exact measurement between the two objects will be registered at the indicator line A. In the foregoing example, the ring 12 will be turned within the binding member so that the lug 14 will be upon one side with respect to the tape, instead of at the end thereof.

When measuring a single object, as a piece of lumber, the ring 12 is turned so that the lug 14 will be at the end of the tape, and the slide 15 is reversed in its seat so that the tongue 16 will project below the horizontal face of the edge 3 of the casing. The lug 14 may then be engaged with one end of the lumber and the tape unwound until the tongue 16 engages with the other end thereof, as shown in Fig. 3, in which position the exact measurement is readable at the indicator line A.

In order to give a correct reading of the measurement being taken, the vertical face of the casing must be maintained in a vertical position when measuring. Said face is formed at right angles to the horizontal face in order that the case may easily assume the correct measuring position. In measuring a flat object, the placing of the horizontal face upon said object will give the proper vertical position to the vertical face of the casing. In measuring spaced objects, the placing of the vertical face against one of said objects will give the proper measuring position to the casing.

The utility, adaptability, and advantages of my improved form of tape measure being obvious, it is unnecessary to further enlarge upon the same herein.

Having now described and pointed out the new and useful features of my invention, I do not limit myself to the shape of certain parts where the shape is not essential, nor do I restrict myself to the exact details of construction shown and described, but mean and intend to claim all equivalents and variations thereof not departing in principle from my invention and falling within the purview of the appended claims.

What I claim as my invention and desire to secure by Letters Patent is:

1. In a measuring device, the combination of a circular casing having a right-angular shoulder formed with a removable portion forming a measuring point when in one position and a closure when reversed, the peripheral wall of said casing having a plurality of openings therein, a tape wound in said body and passed through said openings to expose a portion of the tape to view, thence passing out through another opening to coöperate with said shoulder, an indicator mark on said casing between said openings, and a plurality of rollers in the casing over which the tape is trained to relieve friction.

2. In a measuring device, the combination of a circular casing having a right-angular shoulder, a tape wound in said casing, the peripheral wall of the casing having a plurality of openings through which the tape passes, to expose a portion of the tape to view, thence passing out through another opening to coöperate with said shoulder, a removable member in the right-angular shoulder of said casing forming in one position a measuring stop and in a reversed position a closure for the casing, and a slidably mounted hook member carried by the free end of the tape.

3. In a measuring device, the combination of a circular casing having a right-angular shoulder formed with a removable guide, the peripheral wall of said casing having a plurality of openings, an indicating mark thereon between two of said openings, a tape wound in said body and passed through said openings to expose a portion of the tape to register with the indicating mark and having its end extending from the casing to coöperate with said shoulder, and a plurality of rollers in the casing over which the tape is trained to relieve friction.

4. In a measuring device, the combination of a turbinate shaped casing having a removable member at the apex thereof forming a stop when in one position and a closure when reversed, the peripheral wall of the casing having a plurality of openings therein, a tape wound in said casing and passing through said openings to expose a portion of the tape, the free end of said tape extending from said casing to coöperate with said apex.

In testimony whereof I affix my signature in the presence of two persons.

CHAS. W. CROGAN.

Witnesses:
FRANZ G. BURKEET,
ARTHUR L. THAYER.